United States Patent [19]

Gray

[11] Patent Number: 5,149,125
[45] Date of Patent: Sep. 22, 1992

[54] GOLF DRIVING RANGE CART APPARATUS

[76] Inventor: James Gray, 3835 E. 134th Ct., Thornton, Colo. 80241

[21] Appl. No.: 780,962

[22] Filed: Oct. 23, 1991

[51] Int. Cl.⁵ .............................................. B62B 3/02
[52] U.S. Cl. ................................. 280/651; 280/47.35; 312/324
[58] Field of Search ............................... 211/14, 49.1; 312/270.2, 321.5, 324, 248, 250; 280/47.35, 638, 639, 37, 651, 652, 47.34; 273/32 D

[56] References Cited

U.S. PATENT DOCUMENTS

| | | | |
|---|---|---|---|
| 3,472,392 | 10/1969 | Hahn | 280/47.35 X |
| 3,827,708 | 8/1974 | Derry | 280/651 |
| 4,118,048 | 10/1978 | Spranger et al. | 280/47.35 |
| 4,212,392 | 7/1980 | McKenzie | 312/270.2 X |
| 4,344,660 | 8/1982 | Molnar et al. | 312/250 |

*Primary Examiner*—Andres Kashnikow
*Assistant Examiner*—Michael Mar
*Attorney, Agent, or Firm*—Leon Gilden

[57] ABSTRACT

A golf cart is arranged to include a plurality of parallelepiped wells to receive a stack of golf ball buckets therewithin for storage and transport of the golf ball buckets with or without golf balls contained therewithin relative to a driving range in a golf course environment. The invention includes a modified aspect of a plurality of container members hingedly mounted together securable relative to an underlying cart structure arranged for pivotment to an aligned orientation relative to the various wells.

8 Claims, 4 Drawing Sheets

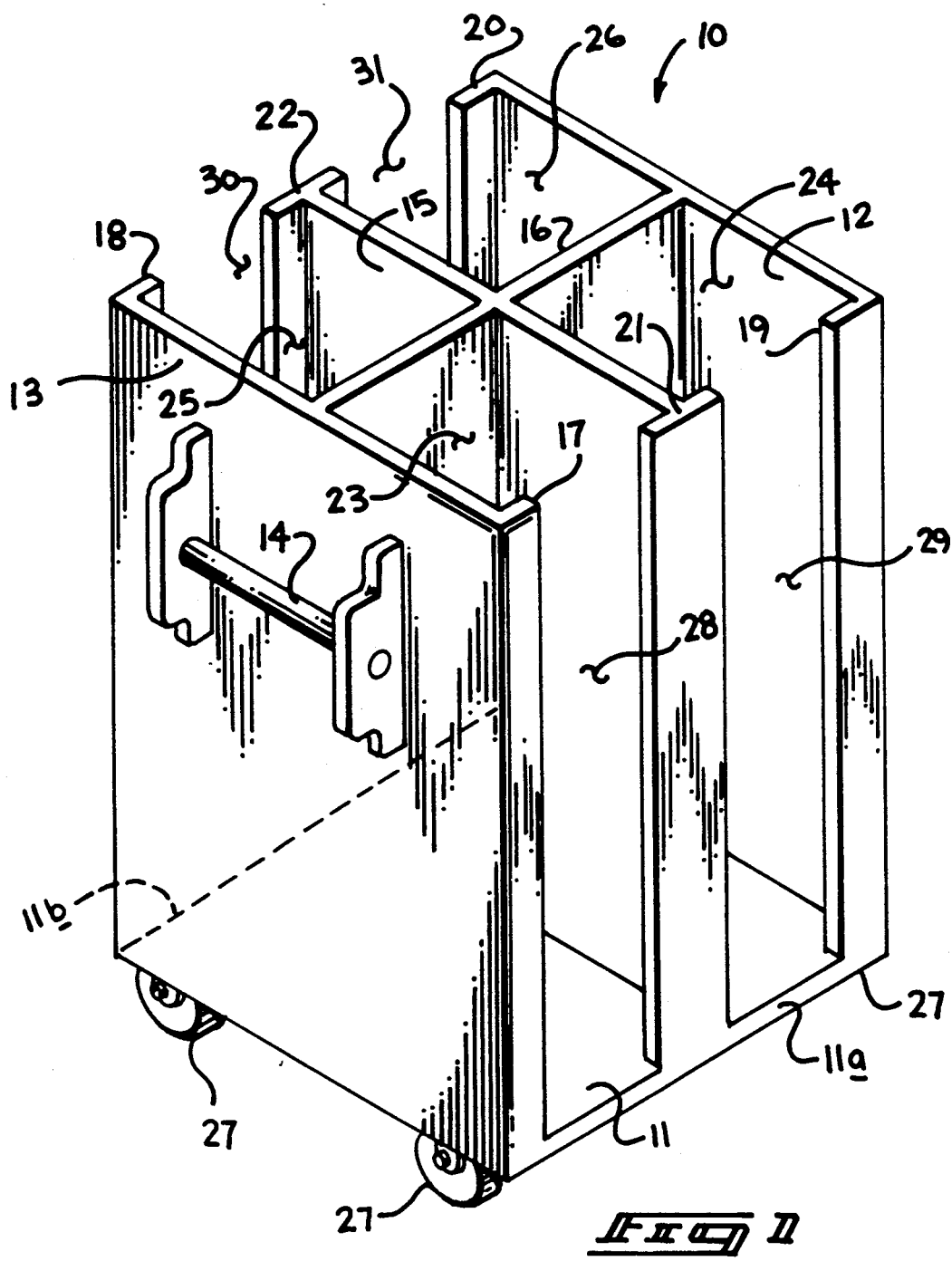

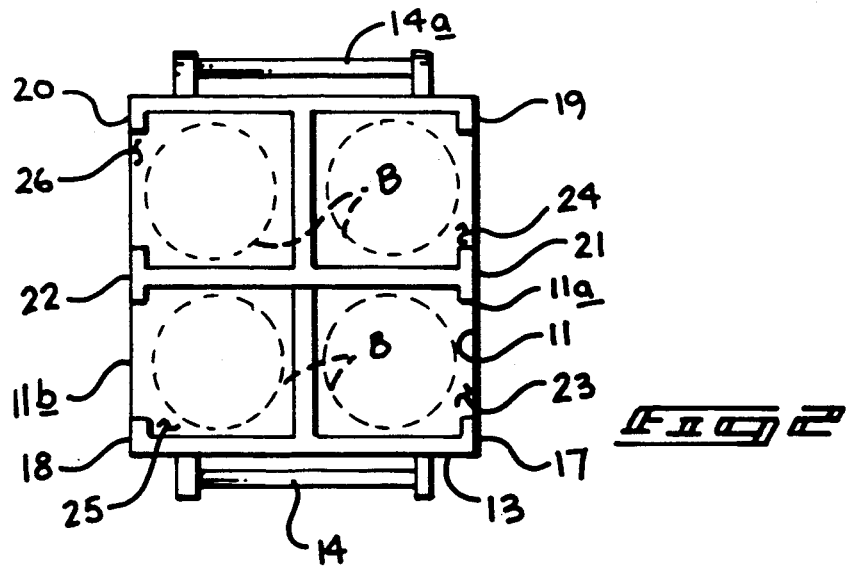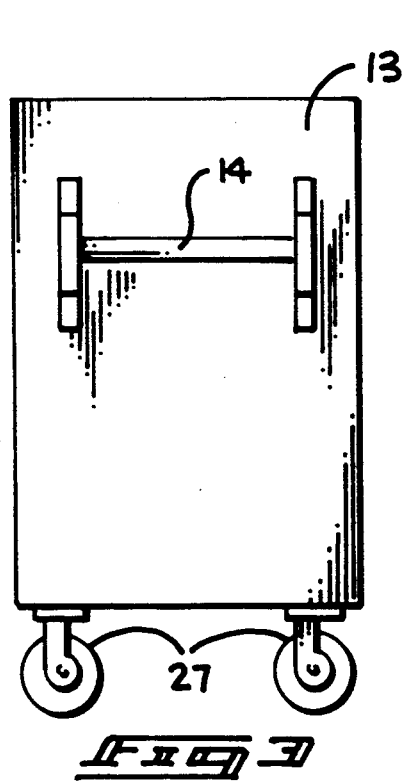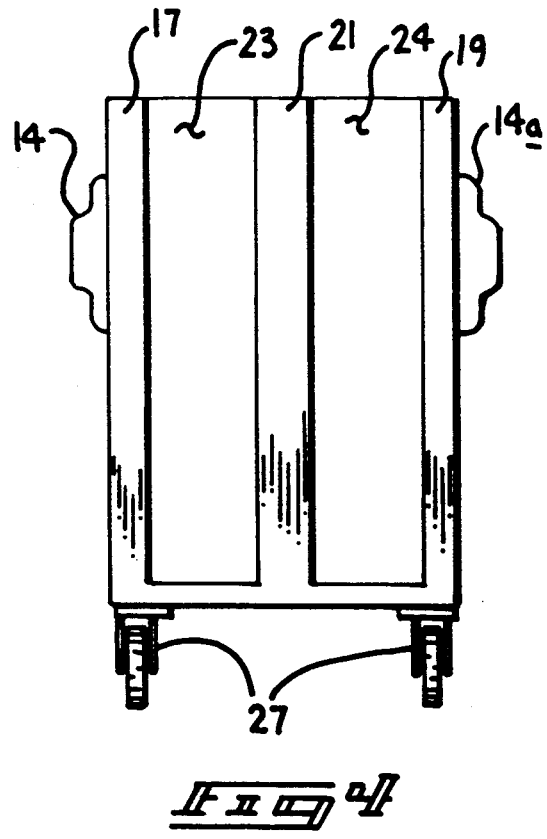

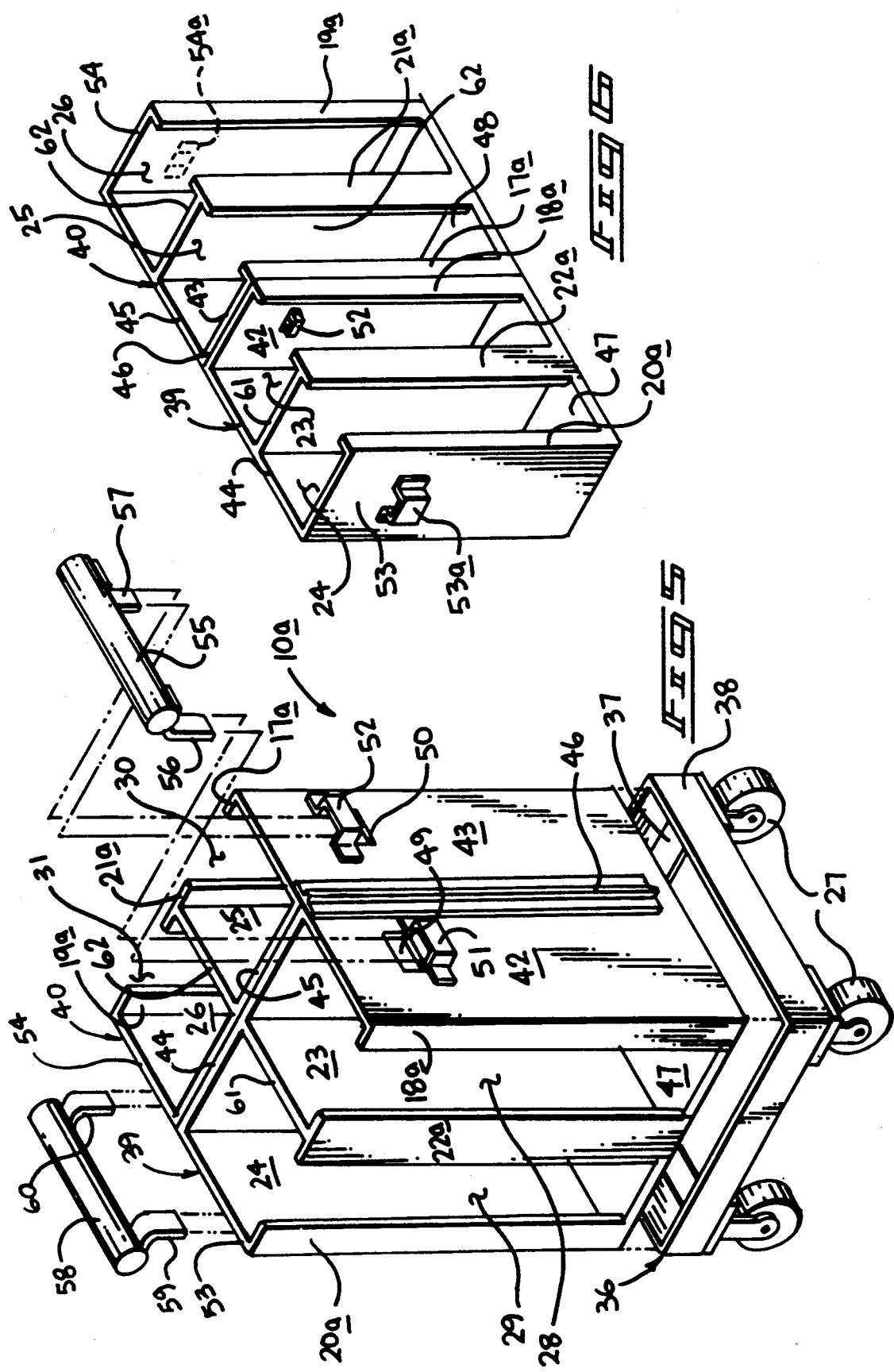

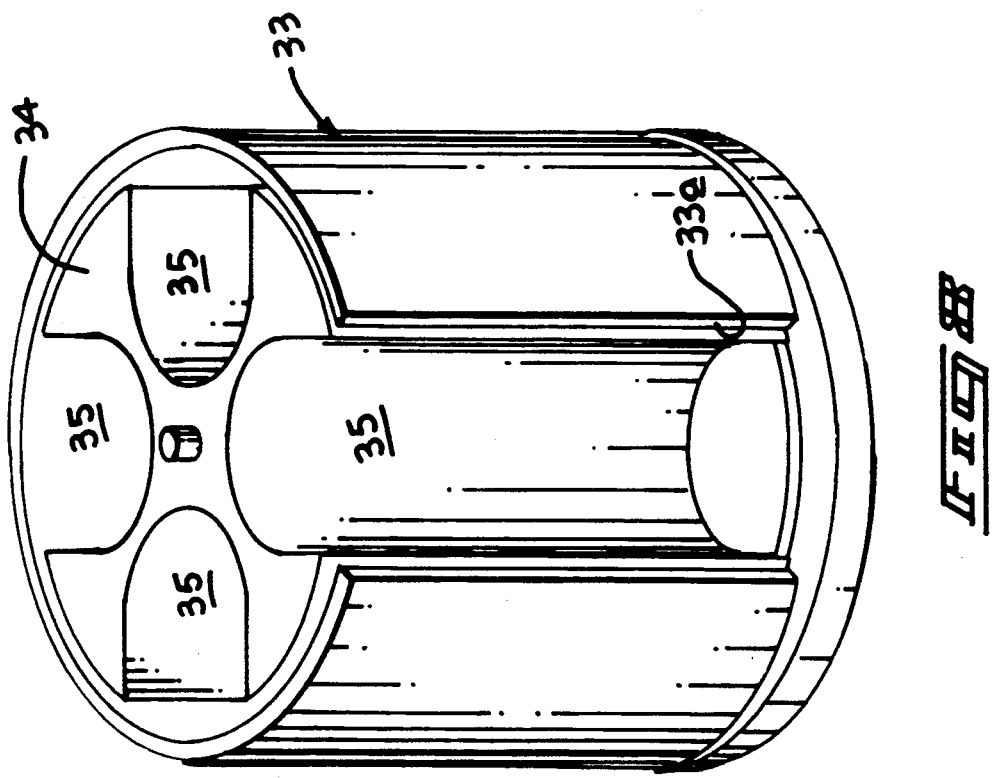
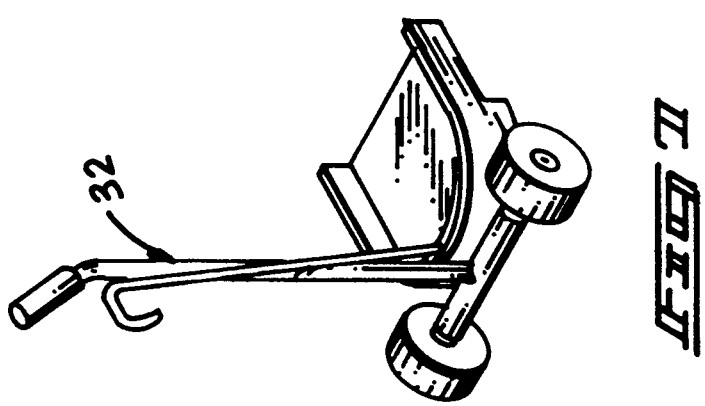

GOLF DRIVING RANGE CART APPARATUS

BACKGROUND OF THE INVENTION

1. Field of the Invention

The field of invention relates to golfing apparatus, and more particularly pertains to a new and improved golf driving range cart apparatus wherein the same is arranged with a plurality of wells to receive a stack of golf ball buckets for transport and storage.

2. Description of the Prior Art

The transport and position of golf ball buckets and the associated golf balls within relative to a driving range is a cumbersome arrangement relative to their transport and storage and their awkward nature. The instant invention attempts to provide a golf cart structure permitting ease of transport of such buckets of golf balls relative to a driving range, as may be found in any of a multitude of contemporary golf ball driving ranges. While storage apparatus of prior art has been available for transporting various components, none have availed themselves to the particular nature of the problem in manipulating the golf ball bucket structure. For example, U.S. Pat. No. 3,746,358 to Swick, Jr., et al. sets forth a hand cart arranged for the stacking of goods therewithin utilizing conventional caster wheels mounted to a bottom surface thereof.

U.S. Pat. No. 3,827,708 to Derry sets forth a portable picnic cart mounted within an underlying carriage structure.

As such, it may be appreciated that there continues to be a need for a new and improved golf driving range cart apparatus as set forth by the instant invention wherein the same addresses both the problems of ease of use as well as effectiveness in construction and in this respect, the present invention substantially fulfills this need.

SUMMARY OF THE INVENTION

In view of the foregoing disadvantages inherent in the known types of cart apparatus now present in the prior art, the present invention provides a golf driving range cart apparatus wherein the same is arranged for the transport and storage of stacks of golf ball buckets therewithin. As such, the general purpose of the present invention, which will be described subsequently in greater detail, is to provide a new and improved golf driving range cart apparatus which has all the advantages of the prior art cart apparatus and none of the disadvantages.

To attain this, the present invention provides a golf cart arranged to include a plurality of parallelepiped wells to receive a stack of golf ball buckets therewithin for storage and transport of the golf ball buckets with or without golf balls contained therewithin relative to a driving range in a golf course environment. The invention includes a modified aspect of a plurality of container members hingedly mounted together securable relative to an underlying cart structure arranged for pivotment to an aligned orientation relative to the various wells.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved golf driving range cart apparatus which has all the advantages of the prior art cart apparatus and none of the disadvantages.

It is another object of the present invention to provide a new and improved golf driving range cart apparatus which may be easily and efficiently manufactured and marketed.

It is a further object of the present invention to provide a new and improved golf driving range cart apparatus which is of a durable and reliable construction.

An even further object of the present invention is to provide a new and improved golf driving range cart apparatus which is susceptible of a low cost of manufacture with regard to both materials and labor, and which accordingly is then susceptible of low prices of sale to the consuming public, thereby making such golf driving range cart apparatus economically available to the buying public.

Still yet another object of the present invention is to provide a new and improved golf driving range cart apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic top view of the instant invention.

FIG. 3 is an orthographic end view of the instant invention.

FIG. 4 is an orthographic side view of the instant invention.

FIG. 5 is an isometric illustration of a modification of the invention.

FIG. 6 is an isometric illustration of the invention in an aligned orientation relative to the plurality of containers mounted to the underlying cart structure.

FIG. 7 is an isometric illustration of a transport cart utilized in a further aspect of the invention.

FIG. 8 is an isometric illustration of a further support housing for mounting a plurality of golf ball buckets therewithin.

DESCRIPTION OF THE PREFERRED EMBODIMENT

With reference now to the drawings, and in particular to FIGS. 1 to 8 thereof, a new and improved golf driving range cart apparatus embodying the principles and concepts of the present invention and generally designated by the reference numerals 10 and 10a will be described.

More specifically, the golf driving range cart apparatus 10 of the instant invention essentially comprises a cart structure to include a cart rigid floor 11, with a first side wall 12 spaced from and parallel a second side wall 17. A first and second side wall handle bar 14 and 14a are mounted to respective first and second side walls 12 and 13 for ease of manual manipulation of the cart structure, to include caster wheels 27 mounted to a bottom surface of the floor 11. A first medial wall 15 is arranged parallel to and medially of the first and second side walls and coextensive therewith. A second medial wall orthogonally intersects the walls 12, 13, and 14, as illustrated. A second side wall first flange 17 and a second side wall second flange 18 are parallel relative to one another and project interiorly of the cart forwardly of the second side wall 13, with a first side wall first flange 19 and a first side wall second flange 20 directed towards the second side wall first and second flanges in a coplanar relationship. The first medial wall 15 includes a first medial wall first flange 21 and a first medial wall second flange 22 that are parallel relative to one another, with the first flange 21 coplanar with the flanges 17 and 19, with the first medial wall second flange 22 coplanar with the flanges 18 and 20 as illustrated to define the first, second, third, and fourth wall entrances 28, 29, 30, and 31 respectively. The first wall entrance 28 is defined between the flanges 17 and 21, the second wall entrance 29 is defined between the flanges 21 and 19, the third wall entrance 30 is defined between the flanges 18 and 22, and the fourth wall entrance 31 is defined between the flanges 22 and 20. In this manner, the buckets "B", such as illustrated in FIG. 2, are arranged in a stacked relationship and are maintained within the respective first, second, third, and fourth parallelepiped wells 23, 24, 25, and 26 respectively. Access to the buckets "B" is thereby afforded through the various wall entrances for storage, removal, and transport of the buckets as required relative to a golf driving range permitting ease of transport and manipulation of the cumbersome bucket structure.

The FIGS. 5 and 6 illustrate the use of a modified cart apparatus 10a that permits the transport of the housing structure, or alternatively permits unfolding of a first and second container structure 39 and 40 respectively relative to one another for mounting against a wall surface (not shown) for ease of storage of the container structure for use of the structure in a display or in a transport mode relative to the FIGS. 6 and 5 respectively.

The support cart 36 is formed with a cart rigid form 11 of a generally rectilinear configuration, with a continuous side wall 38 extending orthogonally upwardly relative to the floor 37. The floor 37 and the side wall 38 are arranged to receive the first and second containers 39 and 40 when the respective first and second container rear walls 44 and 45 are in a contiguous coextensive relationship relative to one another, such as illustrated in the FIG. 5. The first container includes a first container first side wall 42 and the second container includes a second container first side wall 43 that include a hinge 46 mounted at an intersection of the first container first side wall 42 and the first container rear wall 44 relative to the first container and to an intersection of the second container first side wall 43 and the second container rear wall 45. The first container first side wall 42 and the second container first side wall 43 are coplanar in the first position when mounted within the cart 36. It should be noted that the first container includes a first container floor 47, with the second container including a second container floor 48 that are coplanar in the first and second position relative to the FIGS. 5 and 6.

A first slot 49 is directed through the first container first side wall 42 spaced adjacent to and above a first container first side wall first loop 51. A second loop 52 is longitudinally aligned with the first slot 49, with the second loop 52 formed on the second container first side wall 43 positioned above and contiguous with a second slot 50 that is longitudinally aligned in a horizontal orientation relative to the first loop 51. In this manner, when the first container 39 and the second container 40 are pivoted to the second longitudinally aligned orientation with the first container first side wall 42 contiguous and coextensive with the second container first side wall 43, the second loop 52 projects through the first slot 49 with the second slot 50 receiving the first loop 51. Accordingly, it is appreciated the first slot 49 and the first loop 51, as well as the second slot 50 and the second loop 52, are spaced an equal distance from the hinge structure 46 to permit the association, such as illustrated in FIG. 6.

The first container 39 includes a first container second side wall 53 parallel to and spaced from the first container first side wall 42 that includes a first container second side wall loop 53a, wherein the second container includes a second container second side wall 54 spaced from and parallel the second container first side wall 43, with the wall 54 including a second container second side wall loop 54a that are longitudinally aligned relative to one another. In this manner, a first handle 55 includes a first handle first leg 56 and a first handle second leg 57 projecting orthogonally downwardly relative to the handle member 55, wherein the first and second legs 56 and 57 are parallel relative to one another and received through the loops 53a and 54a to assist in the locking of the first and second containers in the first position, as illustrated in FIG. 5. A second handle 58 formed with a second handle first leg 59 and a second handle second leg 60 parallel relative to one another are orthogonally oriented relative to the second handle 58 and received through the first and second loops 51 and 52. The first container includes a first container medial wall 61 longitudinally aligned with a second container medial wall 62 in the first position and parallel and spaced from the second container medial wall 62 in the second position. The use of the modified second container first side wall flange 17a, as well as the first container first side wall 42 formed with the second flange 18a, and the third flange 19a and fourth flange 20a mounted to spaced terminal ends of the second walls 53 and 54 in cooperation with a first medial flange 21a and a second medial flange 22a directed through the pairs of flanges 17a-19a, and 18a-20a respectively form the respective first, second, third, and fourth parallelepiped wells 23-26 respectively. The use of the wells as in the aspect of the invention as set forth in the FIGS. 1-4 is obtained through the entrance openings well entrances 28, 29, 30, and 31 respectively defining the first, second, third, and fourth parallelepiped well entrances.

FIGS. 7 and 8 illustrate the use of a support cart 32 arranged for transport of bucket "B" thereon for reception within a support housing 33 formed with a rotary central core 34, wherein a support housing slot 33a directed through a side wall of the cylindrical support housing wall permits projection of the buckets "B" within each of the recesses 35 as a further modified aspect of the invention.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A golf driving range cart apparatus, comprising:
   a wheeled support cart including a support cart floor and a support cart continuous side wall projecting orthogonally upwardly relative to the floor defining a parallelpiped cavity,
   first and second containers, each of said containers including a first side wall, a rear wall, and a front wall, said front wall of each container having at least one opening for entrance into at least one well formed therein, the rear wall and the first side wall of the first container defining a first intersection and the rear wall and the first wall of the second container defining a second intersection, a hinge connecting said first container to said second container at said first and second intersections for pivotal movement between a first position in which the rear walls of said first and second containers are in a contiguous coextensive, back-to-back relationship and the first walls of said first and second containers are in a coplanar relationship and a second position in which the rear walls of said first and second containers are in a coplanar relationship and the first walls of said first and second containers are in a contiguous coextensive relationship, a lower portion of said first and second containers adapted to be received within the cavity of the support cart while in their first position, and a first handle member including means for removably securing the first handle member to the first side walls of said first and second containers while in their first position.

2. An apparatus as set forth in claim 1 wherein the first container includes a first container floor and the second container includes a separate second container floor that are coplanar in the first position and in the second position.

3. An apparatus as set forth in claim 2 wherein the first container first side wall includes a first slot spaced above and contiguously oriented relative to a first loop, wherein the first slot and the first loop are spaced from the hinge a predetermined spacing, and the second container first side wall includes a second slot longitudinally aligned with the first loop and wherein the second container first side wall further includes a second slot spaced below and contiguous with the second loop, wherein the second slot is longitudinally aligned with the first loop, and the second slot and the second loop are spaced the predetermined spacing relative to the hinge, wherein the first slot receives the second loop and the first loop is received within the second slot in the second position.

4. An apparatus as set forth in claim 3 wherein the first handle member includes a first handle member first leg and a first handle member second leg, wherein the first handle member first leg and the first handle member second leg are parallel relative to one another and orthogonally oriented relative to the first handle member, and wherein the first handle member first leg is received within the first loop and the first handle second leg is received within the second loop in the first position.

5. An apparatus as set forth in claim 4 wherein the first container includes a first container second side wall, and the second container includes a second container second side wall that are coplanar in the first position and are parallel and spaced relative to one another in the second position, wherein the first container first side wall includes a first container second side wall loop and the second container second side wall includes a second container second side wall loop that are longitudinally aligned relative to one another in the first position, and further including a second handle, wherein the second handle includes a second handle first leg and a second handle second leg that are parallel relative to one another and orthogonally oriented relative to the second handle, wherein the second handle first leg is received within the first container second side wall loop and the second handle second leg is received within the second container second side wall loop in the first position.

6. An apparatus as set forth in claim 4 wherein the first container includes a first container medial wall and the second container includes a second container medial wall, wherein the first container medial wall and the second container medial wall are coplanar in the first position and are parallel and spaced relative to one another in the second position, wherein the first container medial wall is positioned medially of, parallel to, and coextensive with the first container first side wall and the first container second wall, and the second container medial wall is arranged to orthogonally bisect the second container rear wall and arranged parallel to, medially of, and coextensive with the second container first wall and the second container medial wall.

7. An apparatus as set forth in claim 6 including a first parallelepiped well directed between the first container first side wall and the first container medial wall, and a second well directed between the first container medial wall and the first container second side wall, and a third well defined between the second container first side wall and the second container medial wall, and a fourth parallelepiped well directed between the second container medial wall and the second container second side wall.

8. An apparatus as set forth in claim 6 wherein the first container medial wall includes a second medial flange and the second container first medial wall includes a first medial flange, wherein the first medial flange and the second medial flange are parallel relative to one another in the first position and are coplanar relative to one another in the second position.

* * * * *